US006998082B2

(12) United States Patent
Yang

(10) Patent No.: US 6,998,082 B2
(45) Date of Patent: Feb. 14, 2006

(54) METHOD FOR MANUFACTURING OF WATER-PROOF COVER FOR ZIPPER TAB

(76) Inventor: Shih-Sheng Yang, PO Box 82-144, Taipei (TW)

( * ) Notice: Subject to any disclaimer, the term of this patent is extended or adjusted under 35 U.S.C. 154(b) by 208 days.

(21) Appl. No.: 10/663,721

(22) Filed: Sep. 17, 2003

(65) Prior Publication Data

US 2005/0040559 A1 Feb. 24, 2005

(30) Foreign Application Priority Data

Aug. 21, 2003 (TW) .............................. 92122949 A

(51) Int. Cl.
*B29C 45/14* (2006.01)

(52) U.S. Cl. ...................... 264/156; 264/255; 264/275; 264/271.1; 264/279.1; 264/317; 264/318; 264/325; 264/328.1

(58) Field of Classification Search ................ 264/156, 264/255, 271.1, 279.1, 275, 317, 318, 325, 264/328.1
See application file for complete search history.

(56) References Cited

U.S. PATENT DOCUMENTS 6,240,604 B1 * 6/2001 Fox ............................ 24/429
6,430,785 B1 * 8/2002 Matsushima et al. ......... 24/429

OTHER PUBLICATIONS

Derwent Abstract, 2000-398720 "Manufacture of Pull Tabs of Polychrome Plastic/Rubber Zipper", 2000.*
Derwent Abstract, 2000-348853 "Method for Producing a Pull Tab of a Multi-Colored Plastic (Rubber) Zipper", 2000.*

* cited by examiner

*Primary Examiner*—Stefan Staicovici
(74) *Attorney, Agent, or Firm*—Leong C. Lei

(57) ABSTRACT

A method for manufacturing of water-proof cover for zipper tab includes taking a zipper where holes are provided on the tapes thereof at the position adjacent to one end of the tooth-chains; covering an upper mold provided with a sprue thereon and a lower mold on the holes on the tapes, and inserting a core mold in-between the groove and tooth-chains; injecting plastic from the sprue and detaching the upper and lower molds after the plastic is solidified to a desired shape, such that a decorative cover is formed at one end of the tooth-chains; and mounting a zipper tab from the upside of the tooth-chains, and stapling a stopper to each end of the combined tooth-chains. Accordingly, when the zipper is drawn upwardly, the zipper tab can be positioned inside the decorative cover, such that the connecting portion of the tooth-chains and the zipper tab can be covered by the decorative cover and therefore prevent from being wetted by rain.

3 Claims, 5 Drawing Sheets

METHOD FOR MANUFACTURING OF WATER-PROOF COVER FOR ZIPPER TAB

BACKGROUND OF THE INVENTION (a) Technical Field of the Invention

The present invention relates to a method of manufacturing a water-proof cover for zipper tab, and is particularly to a zipper which can be positioned inside of a decorative cover when being drawing upwardly, such that the connection portion of the tooth-chains and the zipper tab can be covered by the decorative cover to prevent water from permeating into said connection portion.

(b) Description of the Prior Art

One of the conventional waterproof zippers as disclosed in R.O.C. Patent No. 513930 titled "Improvement of waterproof zipper" is primarily composed of a dual-usage zipper tab, which has a reduced space between the tooth-chains and the waterproof fabric sheets. The zipper is provided on the top a narrow pass for the two tooth-chains to lock each other inside, and on the bottom a locking groove for two waterproof fabric sheets to enter into for locking purposes. Wherein the narrow locking pass is a taper connecting block divided into two grooves at the center of the entrance end of the two tooth-chains, while the end of the narrow locking pass is in form of a hollow groove, such that the tooth-chains at the inner side of the zipper tapes can enter from the entrance end into the hollow groove and further into the stopper block.

The grooves of the connecting block is designed for the two water-proof fabric sheets to enter therein from the top to the bottom, such that the top and lower ends of the grooves will gradually shrunk and combined to form two holes for the water-proof fabric sheets to enter into the groove holes at the top and lower ends.

When the zipper tab moves upwardly and downwardly, the tooth-chains will close and open, and concomitantly the connecting lock of the water-proof fabric sheets at the other side of the zipper tab will close and open correspondingly. Accordingly, the water-proof zipper, being able to alter the component provided at the end depending on the article to be applied to, is a dual-use, water-proof and air-proof structure.

Although the above-mentioned improvement of waterproof zipper can allow the tooth-chains to close or open simultaneously with the connecting lock of the water-proof fabric sheets at the other side of the zipper tab, in order to obtain the purposes of water-proof, air-proof, when the tooth-chains are in close status, the engagement portion of the zipper tab and the tooth-chains (i.e. where in-between the tooth-chains and the zipper tab) usually would form a certain space, such that the tooth-chains and the zipper tab cannot completed close. Therefore, the splashed water would easily permeate from the space in-between the tooth-chains and the zipper tab; there is a need for improvement of the utilities of the prior art.

SUMMARY OF THE INVENTION

The primary object of the invention is to provide a zipper wherein when is drawn upwardly, the zipper tab can be positioned inside of a decorative cover, such that the connecting portion of the tooth-chains and the zipper tab will form a cover to prevent water from permeating from said connecting position.

To obtain the above purposes, the method for manufacturing of waterproof cover for zipper tab according to the invention includes the following steps:

(1) taking a zipper composed of two long tapes, each of which is provided with a tooth-chain on the sides adjacent to each other such that the two tooth-chains can match with each other; holes are provided on the tapes at the position adjacent to one end of the tooth-chains;

(2) covering an upper mold and a lower mold on the holes on the tapes at the position adjacent to one end of the tooth-chains; the upper mold is provided with a groove on the inner surface and a sprue at one side going through to the groove, such that the holes on the tapes can correspond to the groove on the inner surface of the upper mold; while a sliding groove is provided at the position where the lower mold corresponds to the holes on the tapes; and a core mold is inserted in-between the groove and tooth-chains;

(3) injecting plastic from the sprue of the upper mold into the space between the groove and the core mold and to the sliding groove of the lower mold by way of the holes on the tapes; detaching the molds after the plastic is solidified to a desired shape, such that a decorative cover is formed at one end of the tooth-chains and can be firmly combined with the tapes by way of the holes; taking out the core mold to form a space in-between the decorative cover and the tooth-chains; and (4) mounting a zipper tab from the upside of the tooth-chains, disposing the zipper tab in the space inside of the decorative cover, and stapling a stopper to each end of the combined tooth-chains.

Accordingly, the when the zipper is drawn upwardly, the zipper tab can be positioned inside of a decorative cover, such that the connecting portion of the tooth-chains and the zipper tab will form a cover to prevent water from permeating from said connecting position.

DETAILED DESCRIPTION OF THE EMBODIMENT

Figure 1:
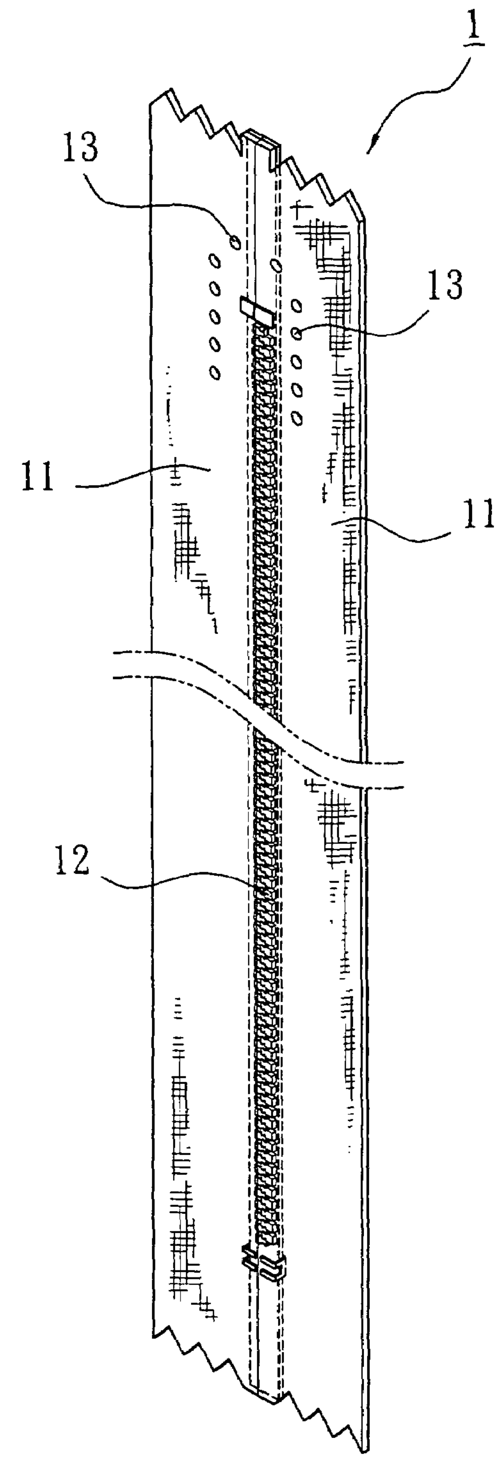
FIG. 1 is an exploded view of the tooth-chains according to the invention.

Referring to FIGS. 1 to 6, the invention discloses a method for manufacturing of water-proof cover for zipper tab, wherein when the zipper is drawn upwardly, the zipper tab can be positioned inside of a decorative cover, such that the connecting portion of the tooth-chains and the zipper tab will form a cover to prevent water from permeating from said connecting position. The invention includes the following steps:

(1) taking a zipper 1 composed of two long tapes 11, each of which is provided with a tooth-chain 12 on the sides adjacent to each other such that the two tooth-chains 12 can match with each other; holes 13 (as shown in FIG.

Figure 2:
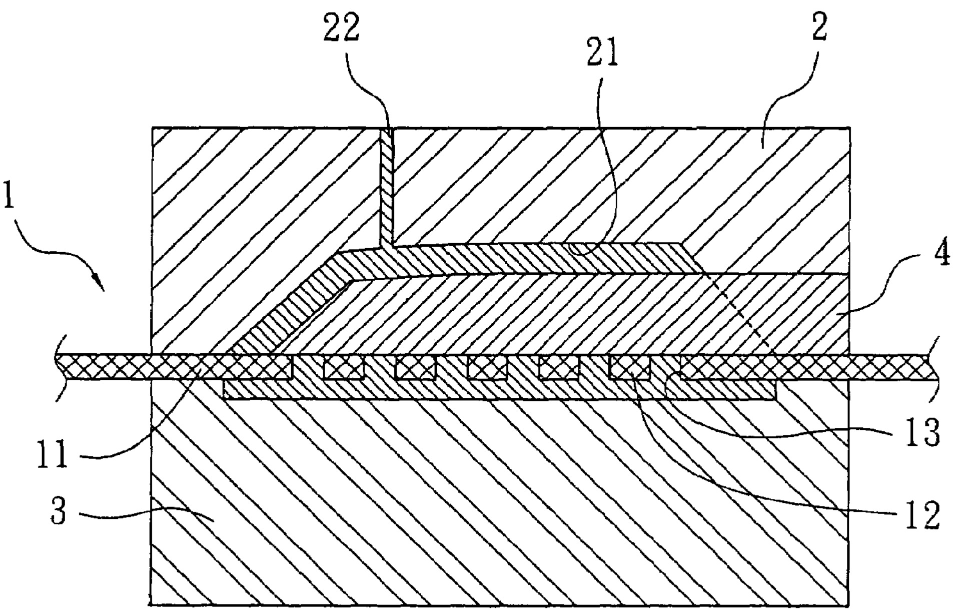
FIG. 2 is a cut-away view of the molds for the decorative cover according to the invention.
Figure 3:
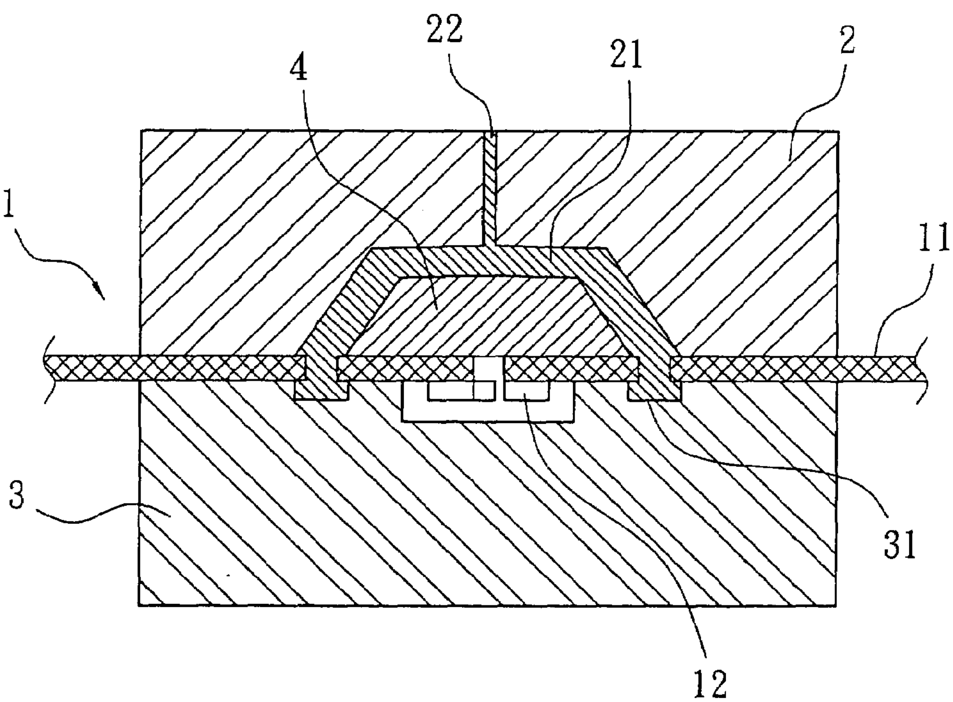
FIG. 3 is a cross-sectional view of the molds for the decorative cover according to the invention.
Figure 4:
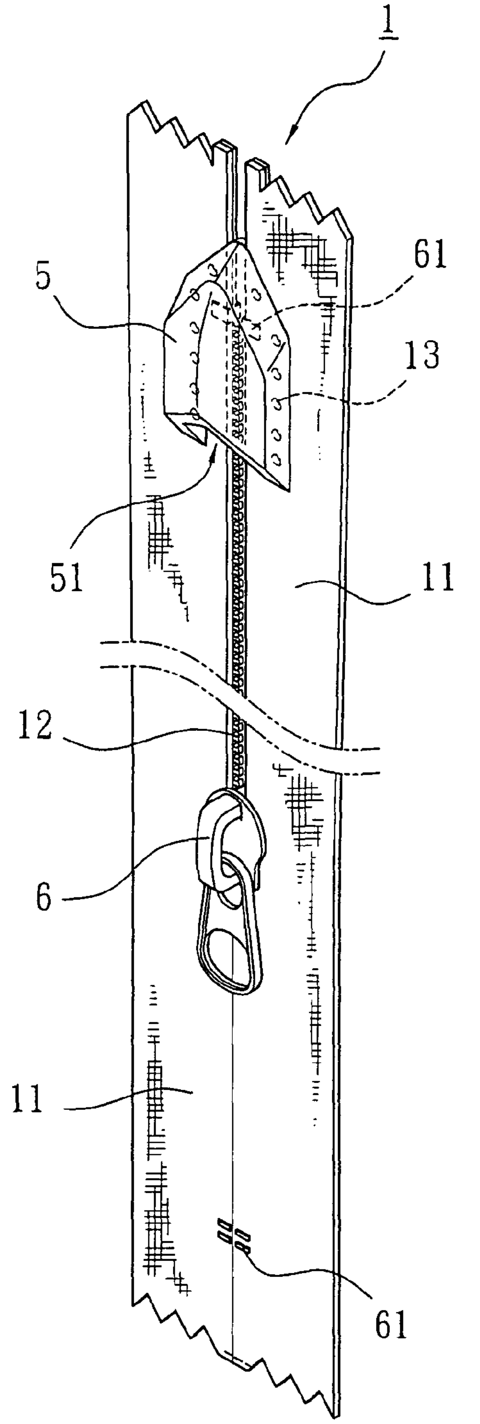
FIG. 4 is an exploded view of the invention after the shape is formed.
Figure 5:
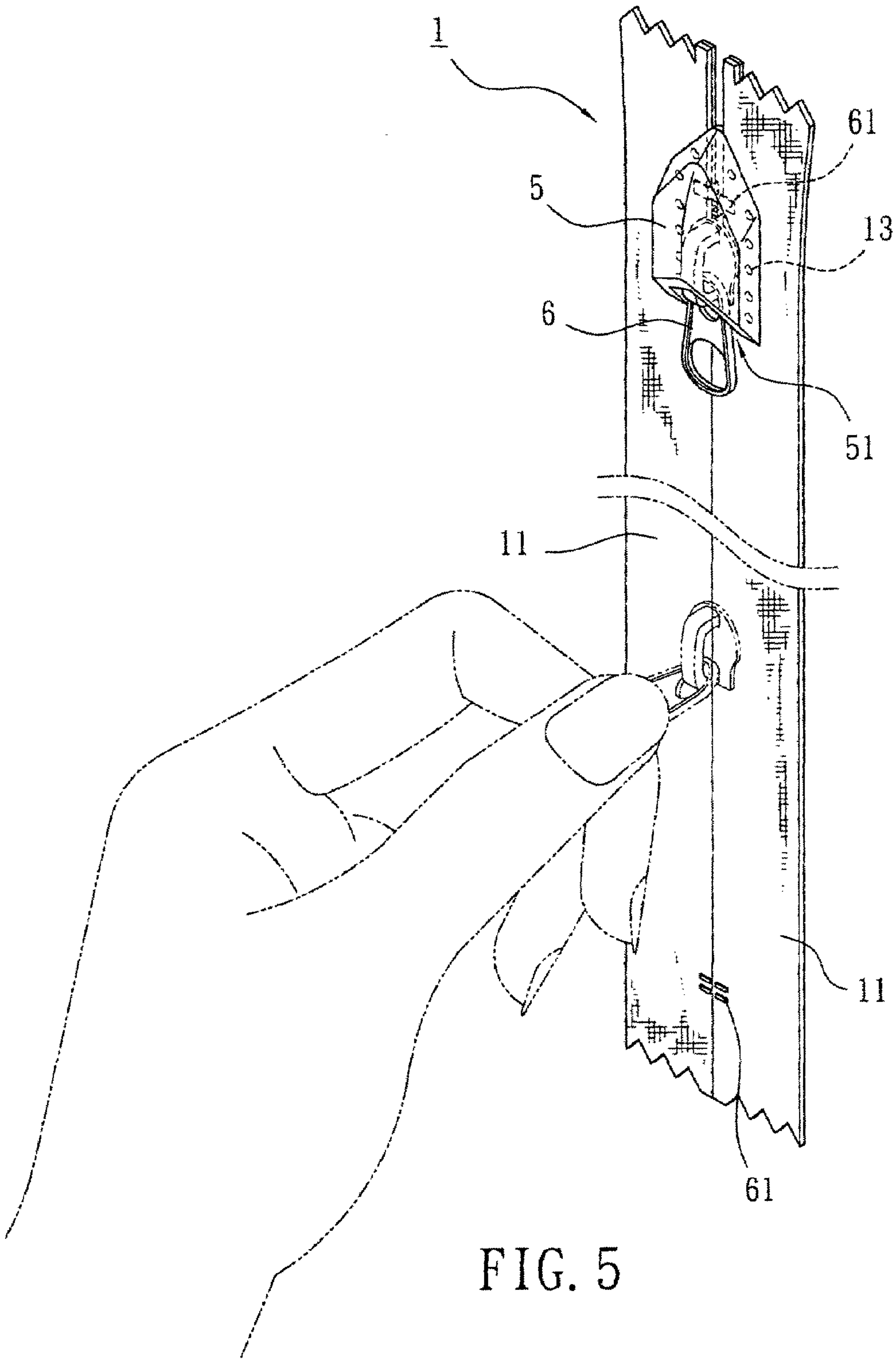
FIG. 5 shows the invention in use status.

1) are provided on the tapes 11 at the position adjacent to one end of the tooth-chains 1;

(2) covering an upper mold 2 and a lower mold 3 on the holes 13 on the tapes 11 at the position adjacent to one end of the tooth-chains 1; the upper mold 2 is provided with a groove 21 on the inner surface and a sprue 22 at one side going through to the groove 21, such that the holes 13 on the tapes 11 can correspond to the groove 21 on the inner surface of the upper mold 2; while a sliding groove 31 is provided at the position where the lower mold 3 corresponds to the holes 13 on the tapes 11; and a core mold 4 slightly smaller than the groove 21 of the upper mold 2 is inserted in-between the groove 21 and tooth-chains 1 (as shown in FIG. 2);

(3) injecting plastic from the sprue 22 of the upper mold 2 into the space between the groove 21 and the core mold 4 and to the sliding groove 31 of the lower mold 3 by way of the holes 13 on the tapes 11; detaching the molds 2, 3 after the plastic is solidified to a desired shape, such that a decorative cover 5 is formed at one end of the tooth-chains 1 and can be firmly combined with the tapes 11 by way of the holes 13; taking out the core mold 4 to form a space in-between the decorative cover 5 and the tooth-chains 1 (as shown in FIGS. 4 and 5); and (4) mounting a zipper tab 6 from the upside of the tooth-chains 1, disposing the zipper tab 6 in the space inside of the decorative cover 5, and stapling a stopper 61 to each end of the combined tooth-chains 1 (as shown in FIGS. 4 and 5).

Figure 6:
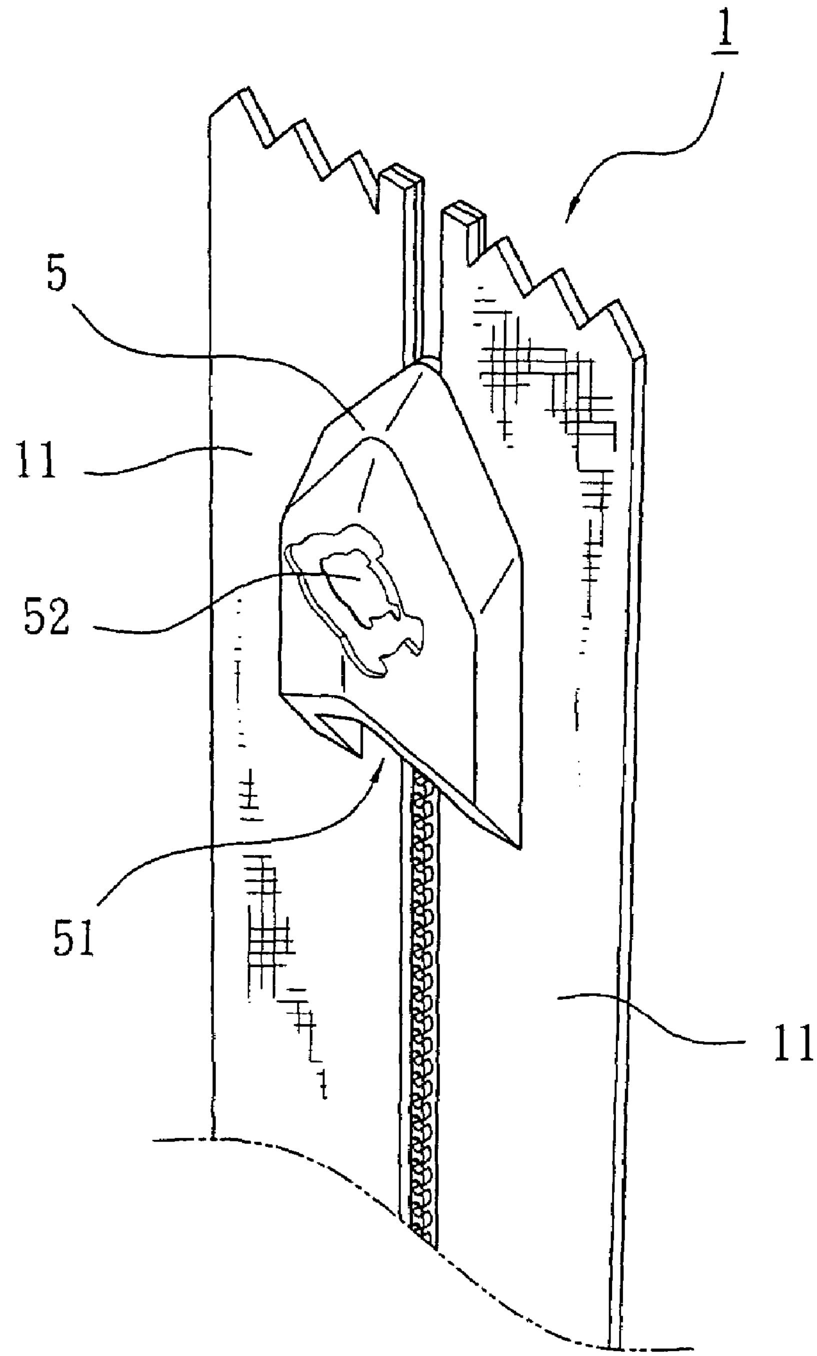
FIG. 6 schematically shows an exemplified embodiment of the invention.

Furthermore, a pattern can be carved on the groove 21 of the upper mold 2, such that the decorative cover 5 can be formed with a pattern 52 on the top surface (as shown in FIG. 6). Accordingly, the above steps are comprised of a method for manufacturing of waterproof cover for a zipper tab (as shown in FIG. 6).

When installing the waterproof zipper tab to an appropriate portion of an article, such as the opening of a backpack, the sides of boots, the opening of gloves, etc., the waterproof cover for the zipper tab would be provided on the surface of the article, while the mode of use will stay the same as that for conventional zipper tab. When drawing the zipper tab 6 upwardly and downwardly to close and open the zipper, the user only needs to draw the zipper tab 6 upwardly toward the position where decorative cover S is and dispose the zipper tab 6 inside the decorative cover 5, then the zipper tab 6 can be positioned inside the space 51 of the decorative cover 5. By way of the shelter of the decorative cover 5, the connecting portion of the tooth-chains 1 and the zipper tab 6 can be protected from water permeation.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for manufacturing of waterproof cover for zipper tab, including the following steps:

(1) taking a zipper composed of two long tapes, each of which is provided with a tooth-chain on the sides adjacent to each other such that the two tooth-chains can match with each other; providing holes on the tapes at a position adjacent to an upper end of the tooth-chains;

(2) covering an upper mold and a lower mold on the holes on the tapes at the position adjacent to one end of the tooth-chains; the upper mold is provided with a groove on the inner surface and a sprue at one side going through to the groove, such that the holes on the tapes can correspond to the groove on the inner surface of the upper mold; while a sliding groove is provided at the position where the lower mold corresponds to the holes on the tapes; and a core mold is inserted in-between the groove and tooth-chains;

(3) injecting plastic from the sprue of the upper mold into the space between the groove and the core mold and subsequently to the sliding groove of the lower mold by way of the holes on the on the tapes; detaching the molds after the plastic is solidified to a desired shape, such that a decorative cover is formed at one end of the tooth-chains and can be firmly combined with the tapes by way of the holes; taking out the core mold to form a space in-between the decorative cover and the tooth-chains; and (4) mounting a zipper tab from the upside of the tooth-chains, disposing the zipper tab in the space inside of the decorative cover, and stapling a stopper to each end of the combined tooth-chains.

2. The method for manufacturing of waterproof cover for zipper tab according to claim 1, wherein a pattern carving on the groove of the upper mold causes the decorative cover to form a pattern on the top surface.

3. The method for manufacturing of waterproof cover for zipper tab according to claim 1, wherein the size of the core mold is slightly smaller than size of the groove of the upper mold.

* * * * *